United States Patent
Cress (10) Patent No.: US 10,502,146 B2
(45) Date of Patent: Dec. 10, 2019

(54) GAS ENGINE FAST START FUEL STRATEGY

(71) Applicant: Caterpillar Inc., Peoria, IL (US)

(72) Inventor: James J. Cress, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 683 days.

(21) Appl. No.: 15/221,213

(22) Filed: Jul. 27, 2016

(65) Prior Publication Data

US 2018/0030905 A1 Feb. 1, 2018

(51) Int. Cl.
| | |
|---|---|
| *F02D 9/02* | (2006.01) |
| *F02B 63/04* | (2006.01) |
| *F02M 35/104* | (2006.01) |
| *F02M 35/10* | (2006.01) |
| *F02M 37/00* | (2006.01) |
| *F02B 43/00* | (2006.01) |

(52) U.S. Cl.
CPC .............. *F02D 9/02* (2013.01); *F02B 43/00* (2013.01); *F02B 63/04* (2013.01); *F02M 35/104* (2013.01); *F02M 35/10255* (2013.01); *F02M 37/0023* (2013.01); *F02D 2009/0201* (2013.01); *Y02T 10/32* (2013.01)

(58) Field of Classification Search
CPC .... F02D 9/02; F02D 2009/0201; F02B 43/00; F02B 63/04; F02M 35/10255; F02M 35/104; F02M 37/0023; Y02T 10/32
See application file for complete search history.

(56) References Cited

U.S. PATENT DOCUMENTS

| | | | | |
|---|---|---|---|---|
| 3,902,472 A | * | 9/1975 | Baugelin | F02M 59/42 123/179.16 |
| 3,941,113 A | * | 3/1976 | Baguelin | F02B 1/06 123/179.1 |
| 4,230,086 A | | 10/1980 | Lovret | |
| 4,597,364 A | * | 7/1986 | Young | F02B 43/00 123/27 GE |
| 5,213,083 A | | 5/1993 | Glassey | |
| 5,261,366 A | * | 11/1993 | Regueiro | F02D 41/3836 123/299 |
| 5,408,975 A | * | 4/1995 | Blakeslee | F02D 41/062 123/491 |

(Continued)

FOREIGN PATENT DOCUMENTS

CN 102877992 A 1/2013

*Primary Examiner* — Hung Q Nguyen
(74) *Attorney, Agent, or Firm* — Miller, Matthias & Hull (57) ABSTRACT

A priming system for an engine system having a throttle valve configured to regulate a flow of air and fuel into an intake manifold of an engine is disclosed. The priming system may include a first sensor configured to generate a first sensor signal indicative of a value of an engine parameter, an auxiliary fuel line configured to direct fuel from a fuel source to a primed cylinder subset of the plurality of cylinders, an auxiliary fuel valve disposed in the auxiliary fuel line, and a controller in communication with the first sensor and the auxiliary fuel valve. The controller may be configured determine the value of the engine parameter from the first sensor signal and cease directing fuel from the auxiliary fuel line to the primed cylinder subset when the engine parameter value is greater than or equal to a threshold engine parameter value.

20 Claims, 6 Drawing Sheets

(56) References Cited

U.S. PATENT DOCUMENTS

| | | | | |
|---|---|---|---|---|
| 5,713,340 | A * | 2/1998 | Vandenberghe | F02B 43/00 |
| | | | | 123/682 |
| 6,371,092 | B1 * | 4/2002 | Guglielmo | F02D 35/0092 |
| | | | | 123/435 |
| 7,051,722 | B2 | 5/2006 | Wells et al. | |
| 7,316,223 | B2 * | 1/2008 | Wakahara | F02M 25/0809 |
| | | | | 123/520 |
| 7,798,128 | B2 | 9/2010 | Bellistri et al. | |
| 8,706,383 | B2 | 4/2014 | Sauve et al. | |
| 8,751,139 | B2 * | 6/2014 | Barr | F02B 33/446 |
| | | | | 123/527 |
| 2009/0165762 | A1 * | 7/2009 | Fitchpatrick | F02D 19/0647 |
| | | | | 123/576 |
| 2013/0275025 | A1 | 10/2013 | Isenberg et al. | |
| 2015/0192082 | A1 | 7/2015 | Guerreiro | |
| 2015/0267673 | A1 | 9/2015 | Bleyer | |

\* cited by examiner

GAS ENGINE FAST START FUEL STRATEGY

TECHNICAL FIELD

The present disclosure relates generally to gaseous fuel powered engines and, more particularly, to a gaseous fuel powered engines for gaseous fuel powered engines.

BACKGROUND

Gaseous fuel powered engines are common in many applications. For example, the engine of an engine generator set (genset) can be powered by natural gas or another gaseous fuel. Natural gas may be more abundant and, therefore, less expensive than alternative fuels. Natural gas may also burn cleaner in some applications. During power outages, natural gas may be readily supplied to genset engines for extended periods of time via a direct connection to a gas utility, or over limited periods of time and in mobile applications via one or more associated storage tanks.

One problem associated with gaseous fuel powered engines is that a greater amount of time may be needed to initially start gaseous fuel powered engines as compared to engines powered by other types of fuel, such as diesel fuel. In particular, whereas diesel fuel may be supplied directly to combustion chambers of the engine, gaseous fuel may normally be supplied to the engine's intake system upstream of an associated compressor, so that the fuel needs to traverse a substantial portion of the intake system before reaching a combustion chamber of the engine. This may be problematic for gaseous fuel powered engines that drive gensets, where it may be desirable to minimize the amount of time between the loss of grid power and the provision of backup power, and/or where regulatory standards on genset startup times are applicable.

One example of a system for starting a gaseous powered engine is disclosed in U.S. Pat. No. 5,713,340 (the '340 patent) that issued to Vandenberghe et al. on Feb. 3, 1998. In particular, the '340 patent discloses a lower-pressure fuel source and a higher-pressure fuel source connected to an engine. The system determines whether the engine is being started based on the engine's speed, and delivers higher-pressure fuel directly to the engine from the higher-pressure fuel source. After the engine has started and a proper air/fuel ratio is achieved, the higher-pressure fuel supplied to the engine is reduced, and a supply of lower-pressure fuel is delivered to the engine from the lower-pressure fuel source during steady state operation. In this arrangement, the system of the '340 patent includes both a low pressure fuel source and a high pressure fuel supply. The starting ability of the system of the '340 patent may be limited by an amount of higher-pressure fuel stored within the higher-pressure fuel source, and a need to replenish the higher-pressure fuel source.

SUMMARY OF THE DISCLOSURE

In one aspect of the present disclosure, a priming system for an engine system is disclosed. The engine system may have may include a throttle valve configured to regulate a flow of air and fuel into an intake manifold of an engine having a plurality of cylinders. The priming system may include a first sensor configured to generate a first sensor signal indicative of a value of an engine parameter, an auxiliary fuel line configured to direct fuel from a fuel source to a primed cylinder subset of the plurality of cylinders, an auxiliary fuel valve disposed in the auxiliary fuel line, and a controller in communication with the first sensor and the auxiliary fuel valve. The controller is configured to determine the value of the engine parameter based on the first sensor signal, and to close the auxiliary fuel valve and cease directing fuel through the auxiliary fuel valve to the primed cylinder subset when the value of the engine parameter is greater than or equal to a threshold engine parameter value.

In another aspect of the present disclosure, a method of priming a fuel system for an engine system is disclosed. The engine system may have a throttle valve configured to regulate a flow of air and fuel into an intake manifold of an engine having a plurality of cylinders. The method of priming the fuel system may include supplying air and fuel to an inlet of the throttle valve, directing fuel from a fuel source through an auxiliary fuel line to a primed cylinder subset of the plurality of cylinders, determining a value of an engine parameter, and closing an auxiliary fuel valve disposed in the auxiliary fuel line and ceasing directing fuel through the auxiliary fuel valve to the primed cylinder subset when the value of the engine parameter is greater than or equal to a threshold engine parameter value.

In a further aspect of the present disclosure, a genset is disclosed. The genset may include an electric generator, and an engine system configured to drive the generator. The engine system may include an engine mechanically coupled to the generator and configured to combust a fuel from a fuel source to rotate the generator, a throttle valve having an inlet and an outlet and configured to regulate a flow of air and fuel to an intake manifold of the engine, a first sensor configured to generate a first sensor signal indicative of a value of an engine parameter, an auxiliary fuel line configured to direct fuel from the fuel source to a primed cylinder subset of a plurality of cylinders of the engine, and an auxiliary fuel valve disposed in the auxiliary fuel line. The genset may further include a controller in communication with the first sensor and the auxiliary fuel valve. The controller may be configured to close the auxiliary fuel valve and cease directing fuel from the auxiliary fuel line to the primed cylinder subset when the value of the engine parameter is greater than or equal to a threshold engine parameter value.

Additional aspects are defined by the claims of this patent.

DETAILED DESCRIPTION

Figure 1:
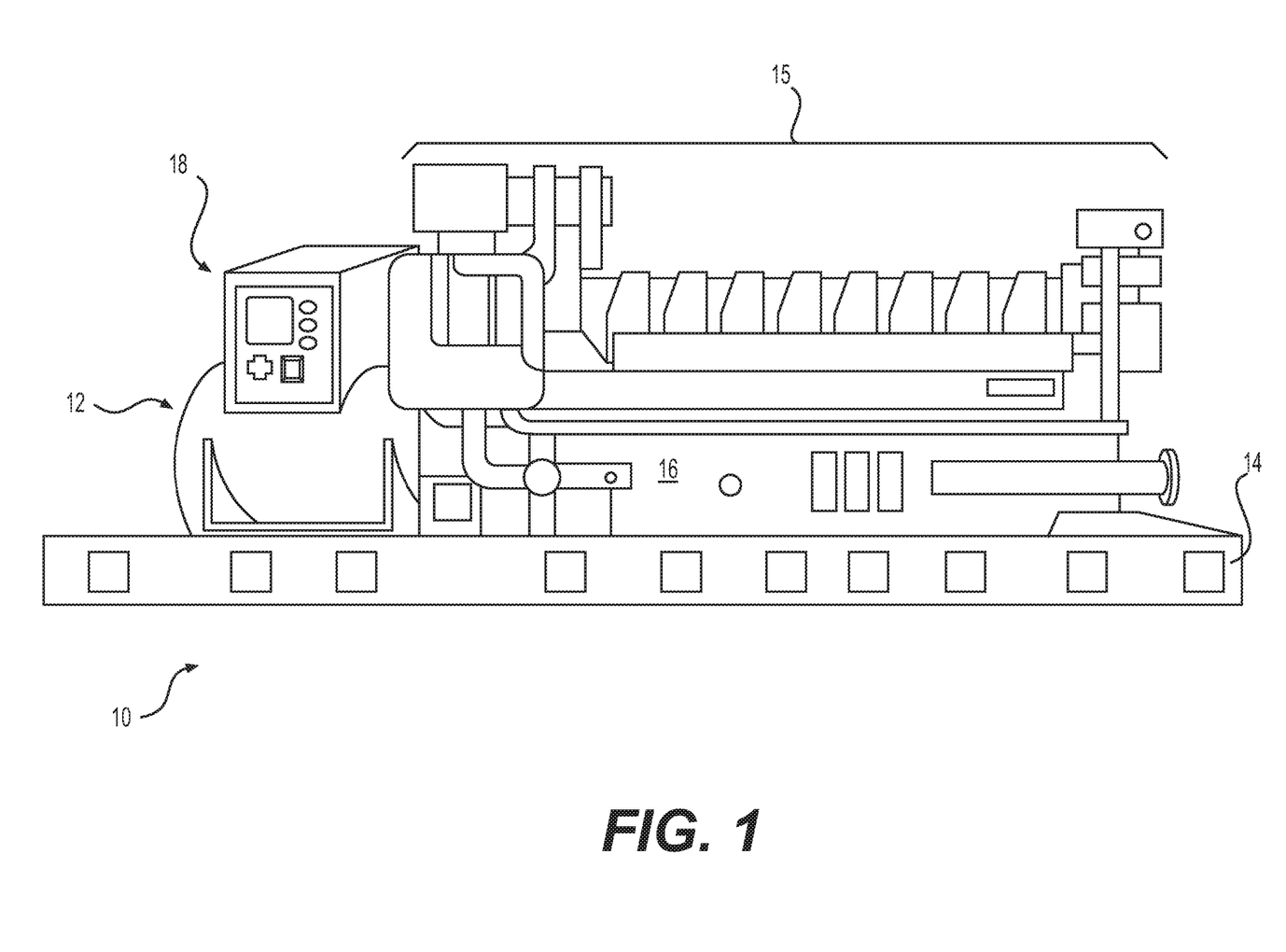
FIG. 1 is a side view of an exemplary genset in which a gas engine fast start fuel strategy in accordance with the present disclosure may be implemented.

FIG. 1 illustrates a generator set (genset) 10 having an electric power generator 12 mounted to a frame 14, and an engine system 15 configured to drive the generator 12. The engine system 15 may include an engine 16 mounted to the frame 14 and coupled to mechanically rotate the generator 12. The genset 10 may also include a controller 18 electronically connected to the engine system 15. The engine system 15 may combust a fuel to generate a rotational mechanical output via the engine 16, and the generator 12 may convert the mechanical output of the engine 16 into electrical power. The controller 18 may be configured to control various functions and operations of the engine system 15. The genset 10 may also include a separate generator controller (not shown) configured to control operations of the generator 12. In some embodiments, the controller 18 may control operations of both the engine system 15 and the generator 12. In other embodiments, the genset 10 may include multiple controllers and/or control modules that are separately associated with the engine system 15 and the generator 12, respectively. Separate controllers may be in electronic communication and may interact and/or cooperate to perform their respective or shared control functions.

The generator 12 may be, for example, an alternating current (AC) induction generator, a permanent-magnet generator, an AC synchronous generator, a switched-reluctance generator, or another type of generator. In one embodiment, the generator 12 may be configured to produce three-phase alternating current with a frequency of 50 and/or 60 Hz. It is contemplated, however, that the generator 12 may be configured to produce single or two-phase power, and/or at another frequency, if desired. The generator 12 may also be configured to convert AC to direct current (DC) before delivering electricity to a consumer. Electrical power produced by the generator 12 may be directed off-board to supplement grid power or to provide isolated consumers with electricity by way of one or more power lines and/or bus bars (not shown). Thus, the genset 10 may be used as a backup power source or a primary power source. For example, if power from a primary power source is interrupted or stops being available, the genset 10 may be used for backup power.

The engine 16 may be a combustion engine, for example, an internal combustion engine that burns a mixture of air and fuel to produce a mechanical power output. For the purpose of this disclosure, the engine 16 is depicted as a gaseous fuel powered engine. For example, the engine 16 may be configured to combust gaseous fuels, such as natural gas (compressed natural gas, liquid natural gas, etc.), biogas, coal gas, propane, butane, methane, hydrogen, or another fuel that is deliverable to the engine 16 in a gas phase. It is contemplated, however, that the engine 16 may also be fueled by other or additional types of fuel, such as diesel, biodiesel, or gasoline, if desired.

Figure 2:
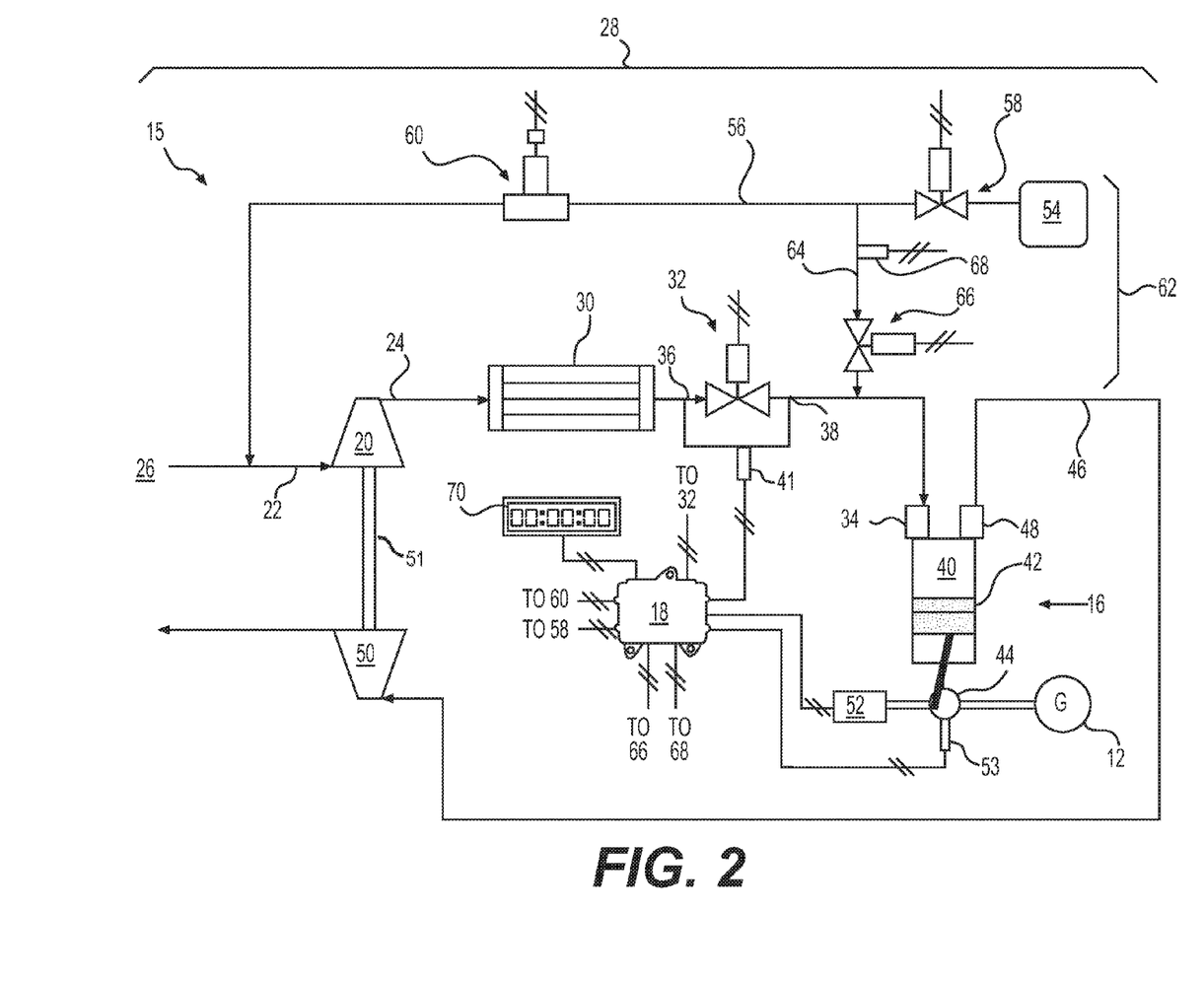
FIG. 2 is a schematic illustration of an engine with a fuel system and priming system them may be implemented in the genset of FIG. 1.

As shown in FIG. 2, the engine system 15 may also include a compressor 20 having an inlet 22 and an outlet 24. The compressor 20 may be configured to draw air from an ambient air source 26 and receive fuel from a fuel system 28 via the inlet 22, and produce a compressed mixture of air and fuel. For example, the compressor 20 may include a plurality of vanes on a rotating disk (not shown) that is driven to draw air and fuel from the inlet 22 and expel the compressed mixture through the outlet 24. A cooling device, such as an aftercooler 30, may be fluidly connected downstream of the outlet 24 to receive and cool the compressed mixture of air and fuel from the compressor 20.

A throttle valve 32 may be configured to selectively pass the cooled compressed mixture from the aftercooler 30 to an intake manifold 34. For example, the throttle valve 32 may receive the compressed mixture through an inlet 36, and regulate passage of the mixture through an outlet 38 via a throttling device, such as a butterfly valve (not shown). The outlet 38 may be fluidly connected to the intake manifold 34, where the mixture of air and fuel may be dispersed among one or more cylinders 40 (only one shown) of the engine 16.

A sensor 41 may be associated with at least the outlet 38 of the throttle valve 32 and configured to determine a pressure, such as an absolute pressure, a gauge pressure, and/or a pressure differential $\Delta_P$ between the inlet 36 and the outlet 38. For example, the sensor 41 may be a pressure differential sensor having two inlet ports, one being fluidly connected to the inlet 36 and the other to the outlet 38, and a diaphragm having a pressure sensing element between the two ports. The pressure sensing element may be a strain gauge, a capacitive sensor, a vibrating wire, or another device configured to sense a deflection of the diaphragm caused by the pressure differential $\Delta_P$ between the inlet 36 and the outlet 38. The sensor 41 may generate a signal indicative of the pressure differential $\Delta_P$ and communicate the signal to the controller 18 for further processing. In other embodiments, individual pressure sensors (e.g., gauge or absolute sensors) having a single port may be positioned on each side of the throttle valve 32 (e.g., one near the inlet 36 and another near the outlet 38), and configured to independently determine a pressure value that the controller 18 may use to determine pressure differential $\Delta_P$.

A piston 42 may be disposed in each cylinder 40 of the engine 16 and configured to reciprocate therein by forces produced when the mixture of air and fuel is ignited or otherwise caused to combust. Each piston 42 may be mechanically connected to a crankshaft 44 of the engine 16 that is coupled to drive the generator 12. Hot exhaust gases may be forced out of the cylinders 40 by the pistons 42 into an exhaust line 46 via an exhaust manifold 48 fluidly connected to the cylinders 40.

A turbine 50 may be mechanically coupled to the compressor 20, and fluidly connected to receive the hot exhaust gases from the exhaust line 46 for recovering energy from the gases to drive the compressor 20. For example, the turbine 50 may include a plurality of vanes on a rotating disk (not shown) configured to absorb energy from the flow of the hot exhaust gases. The turbine 50 may be connected to the compressor 20 via a shaft 51 and transfer rotational mechanical energy to the compressor 20 via the shaft 51. In other embodiments, the compressor 20 may be driven independently from the turbine 50 and may be driven by another device, such as an electric motor or the crankshaft 44, if desired.

A starter 52 may be mounted to the engine 16 and configured to selectively engage and drive a rotational component of the engine 16 during a starting process. The starter 52 may embody, for example, an electric starter motor having a solenoid configured to selectively engage a gear to the rotational component of the engine 16, such as a flywheel, flex plate, or other component coupled to the crankshaft 44. The starter 52 may be electronically connected to the controller 18 and configured to receive a command generated by the controller 18 to engage and drive the engine 16 based on a startup signal received by the controller 18. Upon receiving the command from the controller 18, the starter 52 may engage the rotational component and drive the engine 16 until the controller 18 ends the command. In other embodiments, the starter 52 may embody a hydraulic starter, pneumatic starter, mechanical starter (e.g., spring-powered, crank-powered, etc.) or other type of starter.

The engine system 15 may also include a sensor 53 in communication with the controller 18 and configured to generate a signal indicative of an engine speed $N_E$ of the engine 16. The sensor 53 may embody, for example, a magnetic pickup-type sensor in communication with a magnet embedded within a rotational component of the engine 16, such as the crankshaft 44, a flywheel, or the like. During operation of the engine 16, the sensor 53 may detect a rotating magnetic field produced by the embedded magnet and generate a corresponding feedback signal in response. The signal may have a frequency component directly proportional to the speed $N_E$ of the engine 16. Signals produced by the sensor 53 may be indicative of an actual speed $N_E$ of the engine 16 and directed to the controller 18 for further processing.

The fuel system 28 may be configured to receive fuel from a fuel source 54 and direct fuel to the inlet 22 of the compressor 20 via a fuel line 56. The fuel source 54 may be, for example, a fuel line directly connected to a gas utility (e.g., a natural gas utility), or one or more fuel storage containers (e.g., pressurized fuel tanks). Fuel within source 54 may be stored in a gaseous state, or stored in a liquid state and converted to a gaseous state before reaching the cylinder 40.

A shutoff valve 58 may be disposed in the fuel line 56 and fluidly connected between the fuel source 54 and the inlet 22 of the compressor 20. The shutoff valve 58 may be a control valve in communication with the controller 18, and configured to allow fuel to flow from source 54 to the engine 16 via the fuel line 56 when in an open position, and prevent the flow of fuel when in a closed position. That is, when in the open position, the shutoff valve 58 may allow fuel to be directed to various locations within the fuel system 28. Conversely, when in the closed position, the shutoff valve 58 may entirely prevent fuel from passing to other locations within the fuel system 28. The shutoff valve 58 may be moved to the open or closed position based on command signals from the controller 18.

The fuel system 28 may also include a fuel metering valve 60 configured to receive fuel from source 54 and release controlled amounts of fuel into the inlet 22 of the compressor 20. The fuel metering valve 60 may be fluidly connected to receive fuel from the shutoff valve 58 and release controlled amounts of fuel to the inlet 22 via the fuel line 56. The fuel metering valve 60 may also be in electronic communication with the controller 18. The fuel metering valve 60 may include an actuator configured to receive metering signals from the controller 18 for controlling a mass-flow of fuel delivered to the inlet 22 of the compressor 20. For example, the fuel metering valve 60 may be a solenoid-operated control valve configured to receive metering signals from the controller 18, and adjust a position of the fuel metering valve 60 via the associated solenoid to deliver more or less fuel to the inlet 22 based on the signals from the controller 18. It is understood that the fuel metering valve 60 may embody other types of valves and/or employ different types of automated and/or manual actuators.

The fuel system 28 may also include a priming system 62 configured to deliver fuel from the fuel source 54 to the intake manifold 34 without directing fuel to the inlet 22 of the compressor 20, thereby decreasing an amount of time needed to start the engine 16. The priming system 62 may include an auxiliary fuel line 64 fluidly connected to the fuel line 56 at a location between the fuel source 54 and the inlet 22 of the compressor 20, e.g., between the shutoff valve 58 and the fuel metering valve 60. The auxiliary fuel line 64 may be configured to direct fuel from source 54 to a location downstream of the outlet 38 of the throttle valve 32 via an auxiliary fuel valve 66. That is, the auxiliary fuel line 64 may allow fuel from source 54 to bypass the fuel metering valve 60, the compressor 20, the aftercooler 30, and/or the throttle valve 32, thereby providing a shorter path between the fuel source 54 and the intake manifold 34.

The auxiliary fuel valve 66 may be disposed in the auxiliary fuel line 64 and fluidly connected between the fuel line 56 and the intake manifold 34. The auxiliary fuel valve 66 may be configured to selectively allow fuel to be delivered directly to the intake manifold 34 via the auxiliary fuel line 64 during a startup process of the engine 16. For example, the auxiliary fuel valve 66 may be a solenoid-operated proportional control valve in communication with the controller 18. The auxiliary fuel valve 66 may be adjustable from a fully closed position through a range to a fully opened position, based on signals from the controller 18. For example, the controller 18 may be configured to determine a desired position command $\theta_1$ and generate a signal to adjust the auxiliary fuel valve 66 based on the desired position command $\theta_1$. After a signal based on the desired position command is sent, the controller 18 may store the command as previous position command $\theta_0$, which may be used for further processing. In other embodiments, feedback position control of the auxiliary fuel valve 66 may be used, which may include adjusting the auxiliary fuel valve 66 based on determinations of a desired position and a previous position. Fuel that passes through the auxiliary fuel valve 66 may traverse a shorter distance to reach the intake manifold 34 than fuel passing through the fuel metering valve 60, and therefore may decrease the amount of time needed to start the engine 16.

A sensor 68 may be associated with the auxiliary fuel valve 66 and configured to generate a signal indicative of a pressure of fuel entering the auxiliary fuel valve 66 from the fuel line 56. The sensor 68 may be disposed in the auxiliary fuel line 64 between the fuel line 56 and the auxiliary fuel valve 66 and may be in communication with the controller 18. For example, the sensor 68 may be a gauge or absolute pressure sensor, and include a diaphragm and a sensing element (e.g., strain gauge, capacitive sensor, vibrating wire, etc.) configured to sense a deflection of the diaphragm and generate a signal indicative of the pressure in the auxiliary fuel line 64. The sensor 68 may communicate the signal to the controller 18 for further processing.

The controller 18 may include computer-readable memory, such as read-only memory (ROM), random-access memory (RAM), and/or flash memory; secondary storage device(s), such as a tape-drive and/or magnetic disk drive; a microprocessor(s), a central processing unit (CPU), and/or any other components for running control applications. The microprocessor(s) may comprise any suitable combination of commercially-available or specially-constructed microprocessors for controlling system operations in response to various sensors, including sensors 41, 53, 68, and/or operator inputs. The controller 18 may store instructions and/or data as hardware, software, and/or firmware within the memory, secondary storage device(s), and/or microprocessors. Various other circuits may be associated with the controller 18, such as power supply circuitry, signal conditioning circuitry, solenoid driver circuitry, and other types of circuitry, if desired. As used herein, the term "in communication with" in regard to the controller 18 may include sharing at least one data interface (e.g., via wired and/or wireless transmission hardware) and/or communicating data across at least one data interface. That is, being in communication may include being connected or connectable via a data interface, whether or not the interface is energized (i.e., transmitting data, standing by to transmit data, powered up, etc.).

The controller 18 may be configured to generate command signals based on various inputs, such as signals from sensors 41, 53, 68, operator inputs, and/or maps, tables, algorithms, models, etc., stored within its memory. For example, the controller 18 may be configured to receive an automatically- or manually-generated startup signal, and open the shutoff valve 58 and the auxiliary fuel valve 66 based on the startup signal. The startup signal may, for example, be generated by an operator input (e.g., a key movement to a "start" position, pressing a button, selecting a startup mode, etc.), by a loss of primary grid power, by a computer, by an external power management system (e.g., a building or site power management system), or by a combination of these and/or other parameters. After receiving the startup signal, the controller 18 may generate a command signal to open the shutoff valve 58 and the auxiliary fuel valve 66 in order to allow fuel to flow from the fuel source 54 to the intake manifold 34.

The controller 18 may also be configured to generate a command signal to selectively adjust a position of the auxiliary fuel valve 66 based on operating parameters, such as a speed $N_E$ of the engine 16 and/or a pressure $P_F$ in the auxiliary fuel line 64. For example, using the signals from sensors 53 and 68, the controller 18 may be configured to determine a desired position command $\theta_1$ of the auxiliary fuel valve 66 for achieving a desired fuel delivery rate into the intake manifold 34 based on a map, table, algorithm, or other mathematical operation that correlates engine speed $N_E$, pressure $P_F$ in the auxiliary fuel line 64, and the position of the auxiliary fuel valve 66.

The controller 18 may also be configured to generate a command signal to selectively close the auxiliary fuel valve 66 and/or ensure the auxiliary fuel valve 66 is closed based on one or more closing criteria. Ensuring the auxiliary fuel valve 66 is closed may include checking and acknowledging that the auxiliary fuel valve 66 is closed and/or closing the auxiliary fuel valve 66 when the auxiliary fuel valve 66 is open and one or more of the closing criteria has been achieved.

For example, the controller 18 may be configured to ensure the auxiliary fuel valve 66 is closed when the engine speed $N_E$ is greater than or equal to a threshold engine speed $N_{ET}$. In some embodiments, the threshold engine speed $N_{ET}$ may be an engine speed that indicates a successful startup of the engine 16 has been achieved and/or that the engine 16 is in a running condition. For example, achieving a stable idle speed (e.g., 600-800) RPM may indicate that the engine 16 has successfully started and is in a running condition. It is understood that a different speed or range of speeds may be used to indicate that the engine 16 has successfully started and is in a running condition, if desired.

In other embodiments, the threshold engine speed $N_{ET}$ may be a speed at which the engine 16 will successfully start up without further fueling from the auxiliary fuel valve 66. This threshold engine speed $N_{ET}$ may be less than an idle speed of the engine 16. For example, achieving an engine speed between 350-400 RPM (inclusive) may allow the engine 16 to successfully start without further fueling from the auxiliary fuel valve 66 even though such a speed may be below an idle speed of the engine 16. However, it is understood that the threshold engine speed $N_{ET}$ at which the engine 16 will start without further fueling from the auxiliary fuel valve 66 may be higher or lower depending on the circumstances. For example, the threshold engine speed $N_{ET}$ may be higher when the ambient temperature is lower (e.g., during colder weather), when an engine oil temperature is lower, etc. The threshold engine speed $N_{ET}$ may be lower when the ambient temperature is higher (e.g., during warmer weather), when the engine oil temperature is higher, etc. The threshold engine speed $N_{ET}$ may be higher or lower depending on other or additional parameters, such as humidity, altitude, an engine history parameter (e.g., a number hours ran), and/or other parameters.

The controller 18 may determine that the engine speed $N_E$ has reached the threshold engine speed $N_{ET}$ based on signals from sensors (e.g., physical sensors, virtual sensors, etc.) and a map, algorithm, model, or other mathematical function stored within its memory. For example, a map may be generated using empirical testing under various conditions to correlate the threshold engine speed $N_{ET}$ to one or more parameters (e.g., engine speed, ambient temperature, oil temperature, humidity, altitude, etc.). The map may be stored within the memory of the controller 18, and the controller 18 may be configured to determine the threshold engine speed $N_{ET}$ by using the map in conjunction with one or more inputs, such as the engine speed $N_E$ and/or one or more other parameters. The threshold engine speed may be single value or range of values stored within the memory of the controller 18.

In some embodiments, the threshold engine speed $N_{ET}$ may be a crank termination speed of the engine 16. The crank termination speed may be an engine speed at which the starter is disengaged from the engine 16. In one example, the threshold engine speed $N_{ET}$ may be set to the crank termination speed. In another example, control logic for disengaging the starter 52 from the engine 16 may be stored in the controller 18 or in another controller associated with the genset 10, and this control logic may be used to close the auxiliary fuel valve 66 at the same time that the starter 52 is disengaged from the engine 16. The crank termination speed may be an engine speed that is below an idle speed of the engine 16, such as, for example, 350-400 RPM (inclusive). The crank termination speed may be higher or lower. For example, the crank termination speed may vary depending on the circumstances (e.g., ambient conditions, oil temperature, engine type, etc.). In this way, the auxiliary fuel valve 66 may be closed as soon as fuel from the auxiliary fuel line 64 is no longer needed.

The controller 18 may also be configured to ensure the auxiliary fuel valve 66 is closed based on additional or other criteria, if desired. For example, the controller 18 may be configured to ensure the auxiliary fuel valve 66 is closed when the pressure differential $\Delta_P$ across the inlet 36 and the outlet 38 of the throttle valve 32 exceeds a threshold $\Delta_{PT}$.

Ensuring the auxiliary fuel valve 66 is closed may include closing the auxiliary fuel valve 66 when the auxiliary fuel valve 66 is open and the threshold $\Delta_{PT}$ has been exceeded. The pressure differential threshold $\Delta_{PT}$ may indicate that a starting process of the engine 16 has been successful (e.g., that the engine 16 is capable of running without assistance from the starter 52) and the engine system 15 may resume normal running operations (e.g., normal air/fuel control) without delivering fuel through the auxiliary fuel line 64 via the auxiliary fuel valve 66. Alternatively, the pressure differential $\Delta_P$ may be indicative of a likelihood that the engine 16 will achieve a successful startup. For example, achieving the pressure differential threshold $\Delta_{PT}$ may indicate that the engine 16 will successfully start without further fueling from the auxiliary fuel valve 66, even though further assistance from the starter 52 may be required.

For example, the engine 16 may run at a faster rate as the startup process progresses, which may cause air and fuel to be drawn into the intake manifold 34 from the outlet 38 of the throttle valve 32 at a higher flow rate. Accordingly, the air pressure downstream of the throttle valve 32 may drop in response to the flow rate increase, and may cause the pressure differential $\Delta_P$ to exceed the threshold $\Delta_{PT}$. When the controller 18 determines that the pressure differential $\Delta_P$ has exceeded the threshold $\Delta_{PT}$ based on the signal from the sensor 41, the engine 16 may have been successfully started or has reached a condition where engine 16 will start without further fueling from the auxiliary fuel valve 66. The controller 18 may have stored within its memory a map that correlates the pressure differential $\Delta_P$ with successful startups. The map may be generated based on empirical testing and may provide threshold pressure values or ranges of pressure values. The map may also correlate other parameters to the pressure differential threshold $\Delta_{PT}$, such as ambient temperature, oil temperature, humidity, altitude, etc., and the controller 18 may be configured to determine the pressure differential threshold based on operating conditions. The pressure differential threshold may be a single value or range of values stored within the memory of the controller 18.

The pressure differential threshold $\Delta_{PT}$ may be obtained by measuring and recording the pressure differential $\Delta_P$ between the inlet 36 and the outlet 38 of the throttle valve 32 when the engine system 15 is determined to have completed the starting process, during one or more prior startups of the engine 16. For example, the pressure differential threshold $\Delta_{PT}$ may be determined by correlating the differential pressure $\Delta_P$ with an engine parameter that may indicate that the engine 16 has successfully started, such as engine speed, output torque, fuel consumption, etc., over one or more prior startups of the engine 16. Based on the recorded differential pressure $\Delta_P$ value (or values), a desired pressure differential threshold $\Delta_{PT}$ may be determined.

For example, a successful startup may occur when the engine 16 reaches an engine speed $N_E$ of about 600-800 RPM, which may correspond to a pressure drop of about 15-25 kPa across the throttle valve 32. Thus, the pressure differential threshold $\Delta_{PT}$ may be set to a value between about 15-20 kPa (e.g., about 15 kPa), or another value (e.g., a higher or lower value) at which the engine 16 may be expected to have successfully started. Other ways of determining the differential pressure threshold $\Delta_{PT}$ may include selecting an average or median of several recorded pressure differential $\Delta_P$ values, or inputting the recorded values into an algorithm or model for determining a desired pressure differential threshold $\Delta_{PT}$. The controller 18 may be configured to monitor the pressure differential $\Delta_P$ and close the auxiliary fuel valve 66 when the engine 16 has been successfully started, thereby reducing the overall startup time and improving the efficiency of the engine 16.

Closing criteria may also include an elapsed time since a start command has been received by the controller 18. For example, the controller 18 may include a timer 70 configured to track a time elapsed since a beginning of a cranking state of the engine 16. The beginning of a cranking state may occur, for example, when the engine speed $N_E$ reaches a minimum speed (e.g., a non-zero speed), when the shutoff valve 58 is first opened, or when a signal indicative of a desire to start the engine 16 is received. The timer 70 may be embedded in the controller 18 (e.g., an embedded function of the controller 18) or may embody a timer in communication with the controller 18. The timer 70 may produce an analog or digital signal indicative of the elapsed time, which may be communicated to the controller 18 for further processing.

For example, the elapsed time indicated by the timer 70 may be used by the controller 18 to generate a command signal to selectively close the auxiliary fuel valve 66. In some embodiments, the controller 18 may be configured to ensure the auxiliary fuel valve 66 is closed when the time elapsed exceeds an elapsed time limit $T_{LIM}$. The elapsed time limit $T_{LIM}$ may be an amount of time that a startup process of the engine 16 is allowed to last before the controller 18 ends the startup process. The controller 18 may be configured to end the startup process when $T_{LIM}$ is exceeded regardless of the pressure differential $\Delta_P$ between the inlet 36 and the outlet 38 of the throttle valve 32 or any other criteria. For example, the elapsed time limit $T_{LIM}$ may be selected based on an amount of time that the auxiliary fuel valve 66 is allowed to be open without flooding the engine 16 with fuel before the startup is successful. The elapsed time limit may also be selected based on regulatory limits on backup generator startup times for certain applications (e.g., backup power for hospitals). In one embodiment, the elapsed time limit $T_{LIM}$ may be set to less than or equal to 10 seconds. It is understood, however, that the elapsed time limit $T_{LIM}$ may be longer or shorter, if desired.

The controller 18 may also be configured to ensure the auxiliary fuel valve 66 is closed whenever the shutoff valve 58 is in a closed position. That is, the controller 18 may be configured to close the auxiliary fuel valve 66 and/or ensure the auxiliary fuel valve 66 is closed whenever a command signal is generated to close the shutoff valve 58. For example, whenever the controller 18 generates a signal to close the shutoff valve 58, the controller 18 may send the same or a different signal to the auxiliary fuel valve 66 to ensure the auxiliary fuel valve 66 is closed when the shutoff valve 58 is closed. A command signal to close the shutoff valve 58 may be generated, for example, when any of the other closing criteria are satisfied. Command signals to close the shutoff valve 58 may also be generated when a manual shutdown command is received from an operator, when a shutdown command is automatically generated by the controller 18, or when the controller 18 receives a shutdown command from an external source (e.g., a return of primary grid power, a building or site power management system signal, etc.). In this way, controller may be configured to close the auxiliary fuel valve 66 and/or ensure the auxiliary fuel valve 66 is closed when the shutoff valve 58 is closed, regardless of the other closing criteria.

In the implementation illustrated in FIG. 2, the output of the auxiliary fuel valve 66 may be fluidly connected to the outlet 38 to send the fuel from the auxiliary fuel line 64 directly to the intake manifold 34. In such an arrangement, fuel may be provided to all the cylinders 40 during the priming process to quickly get the engine 16 up to the threshold engine speed $N_{ET}$. However, depending on the implementation of the engine system 15, it may be possible to provide auxiliary fuel to less than all of the cylinders 40 during the priming process and still start up the engine 16 to the threshold engine speed $N_{ET}$ in a short amount of time.

Figure 3:
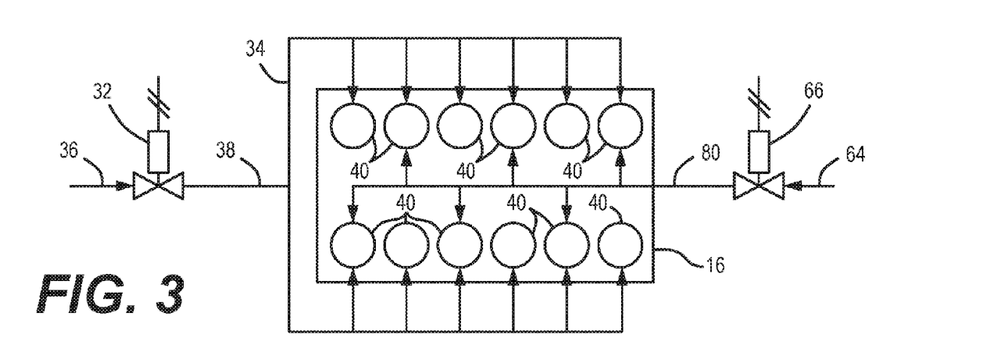
FIG. 3 is a schematic illustration of an embodiment of the engine of FIG. 2 wherein a primed cylinder subset of the cylinders of the engine receive auxiliary fuel from the priming system.

FIG. 3 schematically illustrates an embodiment of the engine system 15 wherein the auxiliary fuel is provided to a primed cylinder subset of the cylinders 40 of the engine 16 during the priming process. As discussed previously, the outlet 38 of the throttle valve 32 is fluidly connected to the intake manifold 34. The intake manifold 34 is fluidly connected to each of the cylinders 40 to provide the air/fuel mixture from the fuel system 28 to the cylinders. The engine 16 as illustrated and described herein is a 12-cylinder engine, but those skilled in the art will understand that the priming process described herein may be implemented in a similar manner in engines having greater than or fewer than twelve cylinders 40.

The auxiliary fuel valve 66 may have an auxiliary fuel valve outlet 80 that is in fluid communication with fewer than the primed cylinders 40 of the engine 16 in the primed cylinder subset. As illustrated, the auxiliary fuel valve outlet 80 is fluidly connected to three of the six cylinders 40 on the top of the engine 16 as viewed in FIG. 3, and to three of the six cylinders 40 on the bottom of the engine 16. As a result, half of the twelve cylinders 40 are primed cylinders 40 that receive auxiliary fuel during the priming process. The primed cylinders 40 connected to the auxiliary fuel valve outlet 80 may be distributed across the engine 16 to avoid creating unbalanced loads and vibration on the engine 16 during the priming process. Consequently, in the illustrated implementation, the auxiliary fuel valve outlet 80 is fluidly connected to the second, fourth and sixth cylinders 40 on the top, and to the first, third and fifth cylinders 40 on the bottom.

The arrangement illustrated schematically in FIG. 3 may be physically implemented in any appropriate manner to supply the auxiliary fuel to the primed cylinders 40 during the priming process. In one physical implementation, the intake manifold 34 may be divided into multiple intake manifolds or intake manifold portions that are each connected to a different subset of the cylinders 40. For example, a first intake manifold portion may fluidly connect the outlet 38 to the subset of non-primed cylinders 40 that do not receive auxiliary fuel from the auxiliary fuel valve 66, and a second intake manifold portion may fluidly connect the outlet 38 to the subset of primed cylinders 40 that do receive auxiliary fuel from the auxiliary fuel valve 66. The auxiliary fuel valve outlet 80 may also connect to the second intake manifold portion to deliver the auxiliary fuel to the primed cylinders 40. During the priming process, the auxiliary fluid will be delivered to the primed cylinders 40 connected to the second intake manifold portion. The non-primed cylinders 40 connected to the first intake manifold portion do not receive fuel and do not assist in increasing the engine speed $N_E$ during the priming process, but fuel is flowing through the fuel system 28 toward the throttle valve 32. Once the fuel circulates through the fuel system 28, the air/fuel mixture is output through the outlet 38 to the first and second intake manifold portions and, correspondingly, to all of the cylinders 40. At this point, the controller 18 can terminate the priming process by causing the auxiliary fuel valve 66 to close and cease outputting auxiliary fuel to the second intake manifold portion and the primed cylinders 40.

In alternative embodiments, the intake manifold 34 can be bypassed during the priming process. Individual runners may extend from the auxiliary fuel valve outlet 80 to each of the primed cylinders 40 that will receive the auxiliary fuel during the priming process. Multiple intake manifolds or intake manifold portions may still be provided, but division of the intake manifold 34 is not required for the priming process. During priming process, auxiliary fuel is provided to the primed cylinders 40 through the auxiliary fuel valve outlet 80 and the corresponding runners. After circulating through the fuel system 28, the air/fuel mixture is provided to all the cylinders 40 through the intake manifold 34 and the priming process can be terminated by closing the auxiliary fuel valve 66.

Figure 4:
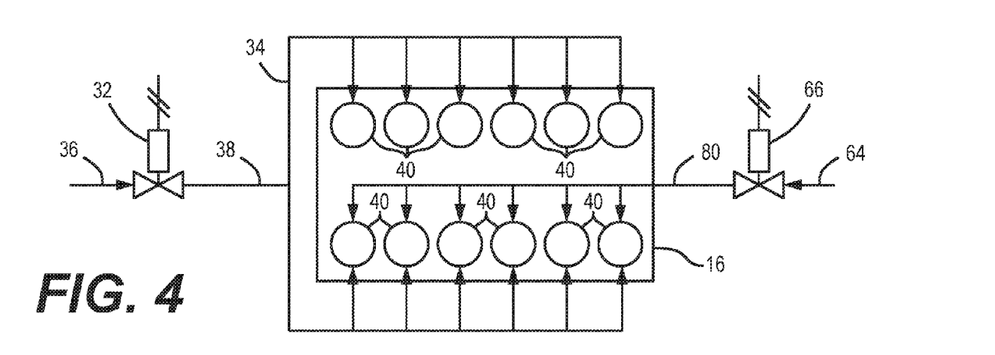
FIG. 4 is a schematic illustration of an alternative embodiment of the engine of FIG. 2 wherein a primed cylinder subset of the cylinders of the engine receive auxiliary fuel from the priming system.
Figure 5:
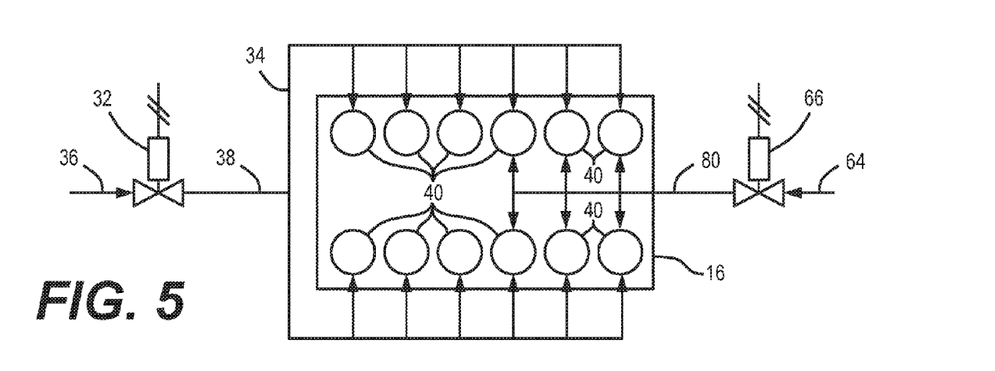
FIG. 5 a schematic illustration of a further embodiment of the engine of FIG. 2 wherein a primed cylinder subset of the cylinders of the engine receive auxiliary fuel from the priming system.

FIGS. 4 and 5 illustrate alternative configurations for providing auxiliary fuel to half of the cylinders 40 during the priming process. In FIG. 4, the auxiliary fuel valve outlet 80 is fluidly connected to all the cylinders 40 on the bottom of the engine 16 as viewed in FIGS. 3-5. In FIG. 5, the auxiliary fuel valve outlet 80 is fluidly connected to the rightmost cylinders 40 of the engine 16. The auxiliary fuel valve outlet 80 could similarly be fluidly connected to the leftmost cylinders 40 of the engine 16, or with any other distribution of the available cylinders 40 between the primed cylinders 40 and the non-primed cylinders 40 that may efficiently bring the engine 16 up to a desired engine speed $N_E$ without creating excessive undesirable loading and vibration in the engine 16. Moreover, the auxiliary fuel valve outlet 80 could be fluidly connected to less than half of the cylinders 40, such as to one-third or one-quarter of the cylinders 40, to provide auxiliary fuel during the priming process so long as combustion in the primed cylinders 40 is sufficient to bring the engine 16 up to the desired engine speed $N_E$ within an acceptable time period.

Figure 6:
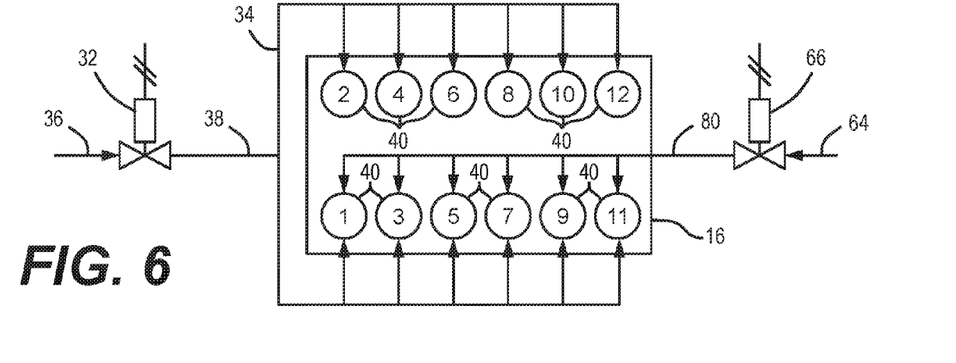
FIG. 6 a schematic illustration of an embodiment of the engine of FIG. 2 wherein a primed cylinder subset of the cylinders of the engine receive auxiliary fuel from the priming system based on a firing order of the engine.

In other embodiments, the primed cylinders 40 to be fluidly connected to the auxiliary fuel valve outlet 80 may be determined based on the firing order of the cylinders 40 in order to efficiently start up the engine 16 during the priming process. FIG. 6 illustrates the engine 16 with the cylinders 40 being numbered from 1 to 12, and reference herein to cylinder 40-1 corresponds to the cylinder 40 numbered 1, cylinder 40-2 corresponds to the cylinder 40 numbered 2, and so on. In one exemplary engine 16, the firing order of the cylinders 40 may be 1-4-9-8-5-2-11-10-3-6-7-12. According to this firing order, one cylinder 40 fires at each 60° increment of rotation of the crankshaft 44.

As shown in FIG. 6, which is similar to FIG. 4, the auxiliary fuel valve outlet 80 is fluidly connected to the primed cylinders 40-1, 40-3, 40-5, 40-7, 40-9 and 40-11 to provide auxiliary fuel so that one primed cylinder 40 fires at each 120° increment of rotation of the crankshaft 44 during the priming process in a similar manner as may be found in a 6-cylinder engine. With this arrangement, primed cylinder 40-1 will fire and combust at 60°, non-primed cylinder 40-4 will fire but not combust because no auxiliary fuel is provided, primed cylinder 40-9 will fire and combust at 180°, non-primed cylinder 40-8 will not combust, primed cylinder 40-5 will fire and combust at 300°, non-primed cylinder 40-2 will not combust, primed cylinder 40-11 will fire and combust at 420°, non-primed cylinder 40-10 will not combust, primed cylinder 40-3 will fire and combust at 540°, non-primed cylinder 40-6 will not combust, primed cylinder 40-7 will fire and combust at 660°, and non-primed cylinder 40-12 will not combust. The effective firing order of the primed cylinders 40 during the priming process is 1-9-5-11-3-7.

Figure 7:
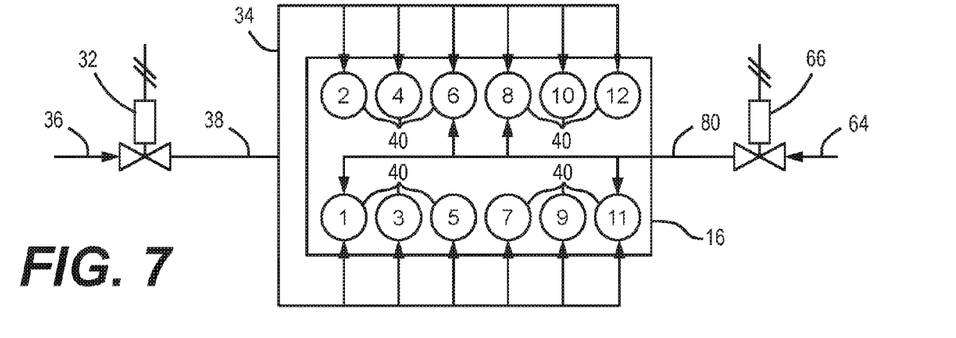
FIG. 7 a schematic illustration of an embodiment of the engine of FIG. 2 wherein one-third of the cylinders of the engine receive auxiliary fuel from the priming system.
Figure 8:
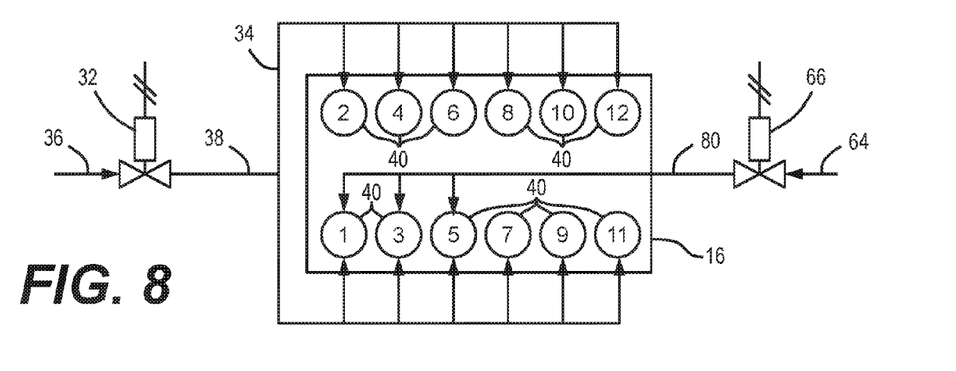
FIG. 8 a schematic illustration of an embodiment of the engine of FIG. 2 wherein one-fourth of the cylinders of the engine receive auxiliary fuel from the priming system.
Figure 9:
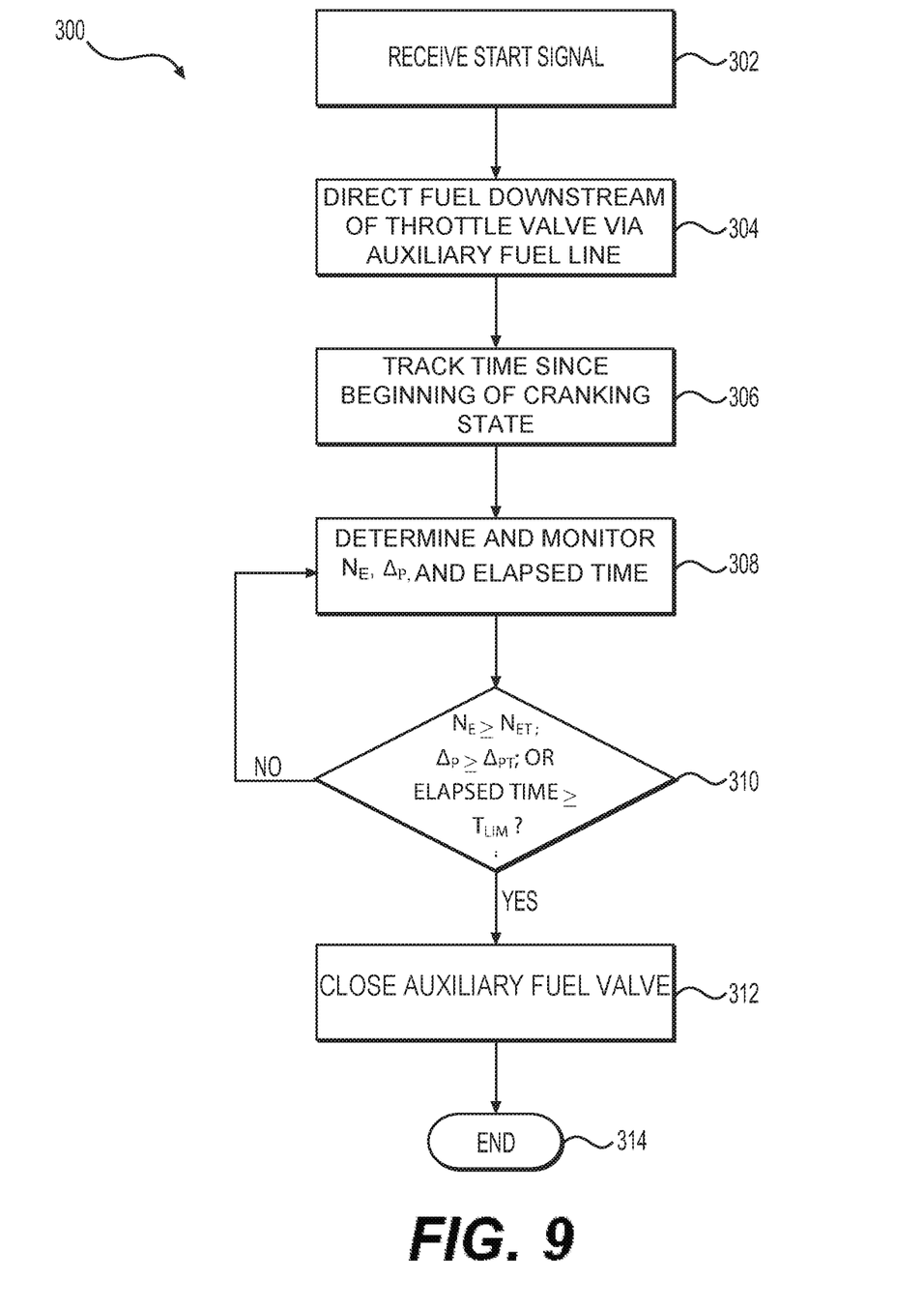
FIG. 9 is a flow chart of an exemplary priming process that may be implemented in the engine of FIG. 2.
Figure 10:
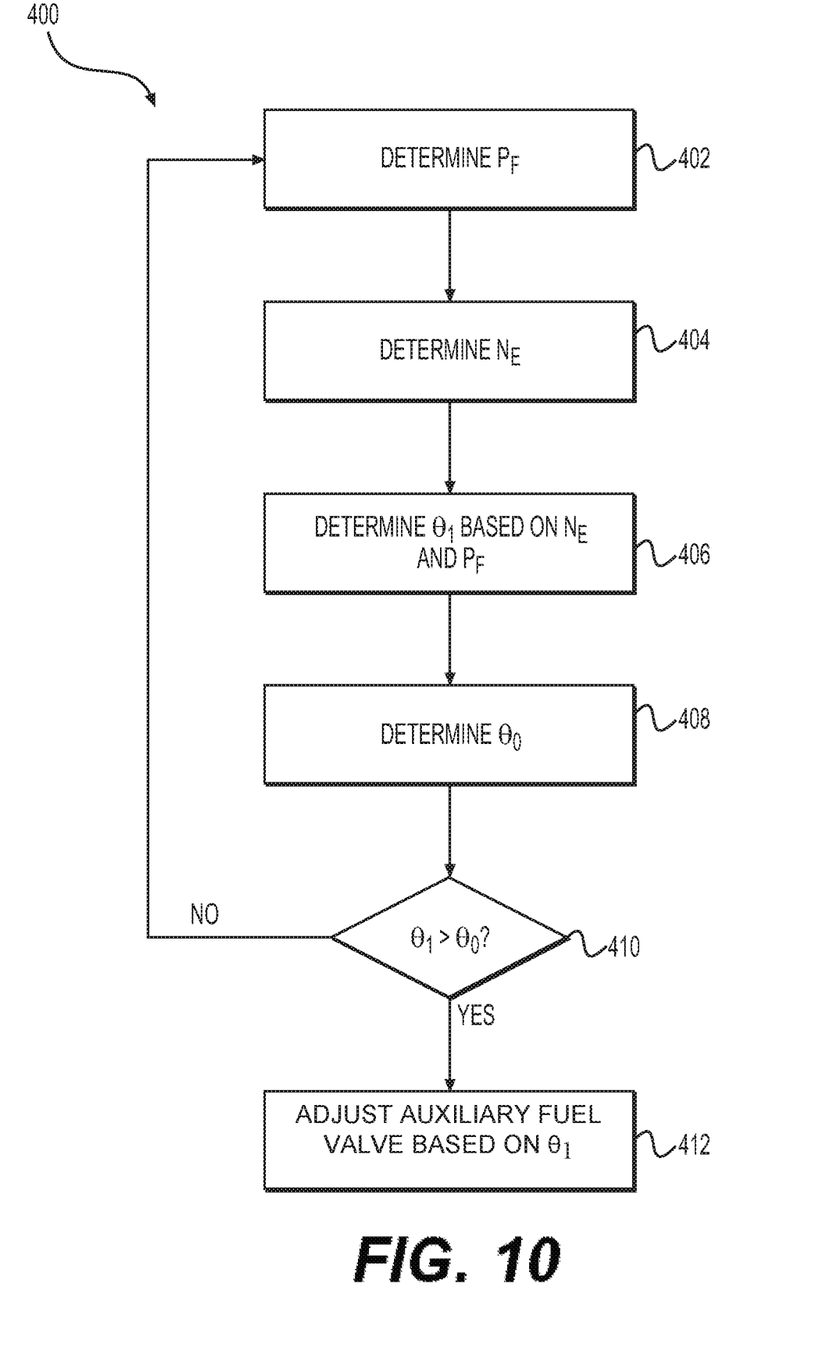
FIG. 10 is a flow chart of an exemplary valve adjustment process that may be used with the priming process of FIG. 9.

FIGS. 7 and 8 illustrate alternative arrangements for connecting fewer than six of the cylinders 40 to the auxiliary fuel valve outlet 80 based on the firing order of the engine 16. Referring to FIG. 7, where the engine 16 may have the same firing order as set forth above, the auxiliary fuel valve outlet 80 may be fluidly connected to four of the cylinders 40 so that every third cylinder 40 in the firing order is provided with auxiliary fuel for combustion during the priming process. As illustrated, the auxiliary fuel valve outlet 80 is fluidly connected to the primed cylinders 40-1, 40-6, 40-8, 40-11. One primed cylinder 40 fires at each 180° increment of rotation of the crankshaft 44 during the priming process similar to a 4-cylinder engine, with the engine 16 having an effective firing order of 1-8-11-6. In further alternatives, the engine 16 could be set up with different primed cylinders 40 for effective firing orders of 4-5-10-7 or 9-2-3-12 to create combustion in one-third of the cylinders 40 during the priming process.

FIG. 8 illustrates a further alternative where the auxiliary fuel valve outlet 80 may be fluidly connected to three primed cylinders 40 so that every fourth cylinder 40 in the firing order is provided with auxiliary fuel. The auxiliary fuel valve outlet 80 is fluidly connected to the primed cylinders 40-1, 40-3, 40-5. One primed cylinder 40 fires at each 240° increment of rotation of the crankshaft 44 during the priming process, with the engine 16 having an effective firing order of 1-5-3. The engine 16 could alternatively be set up with effective firing orders of 4-2-6, 9-11-7 or 8-10-12 to create combustion in one-quarter of the cylinders 40 during the priming process. Utilizing fewer of the cylinders 40 as primed cylinders 40 may facilitate implementation of the priming process with minimal amounts of additional infrastructure in the engine system 15. Those skilled in the art will understand that the firing order used in the preceding discussion is exemplary, and that other firing orders for 12-cylinder engines are known and the primed cylinders 40 utilized in the priming process may vary based on the particular firing order used in the implementation of the engine 16. Moreover, adaptation of the priming system and the fast start strategy in accordance with the present disclosure using a primed cylinder subset of the available cylinders 40 to engines having more or fewer than twelve cylinders 40 and correspondingly adjusted firing orders will be apparent to those skilled in the art and is contemplated by the inventor.

INDUSTRIAL APPLICABILITY

The disclosed priming system finds potential application in any system powered by a gaseous fuel powered engine, where it is desired to reduce the time taken to start the engine. The disclosed priming system has particular applicability in backup power generation applications, for example genset system applications having engines that burn natural gas fuel. One skilled in the art will recognize, however, that the disclosed priming system could be utilized with other gaseous fuel powered systems that may or may not be associated with a genset system. A process 300 of priming the fuel system 28 with the priming system 62 will now be explained with reference to FIGS. 3-4.

As shown in FIG. 3, the priming process 300 may begin when the controller 18 receives an engine startup signal indicative of a desire to start the engine 16 (Step 302). The engine startup signal may be automatically or manually generated. For example, an automatically generated startup signal may be produced when grid power is lost. That is, the controller 18 may be configured to receive a signal from a sensor, another controller, an external power management system, or otherwise determine that grid power to a consumer (e.g., a building, a stadium, a hospital, a plant, a piece of equipment, etc.) has been lost, and it is desired to start the engine 16 in order to drive the generator 12 to produce electrical power to supplement the lost grid power. A manually generated startup signal may be produced by an operator, for example, by turning a key associated with the engine 16 to a "start" position, selecting a startup option or program via a user interface associated with the controller 18, or by performing another type of manual startup procedure.

After the startup signal is received, fuel may be directed downstream of the throttle valve 32 via the auxiliary fuel line 64 (Step 304) to more quickly supply fuel to some or all of the cylinders 40 and allow the engine 16 to start in less time. That is, based on the startup signal, the controller 18 may open the shutoff valve 58 to supply fuel to the fuel system 28, and open the auxiliary fuel valve 66 to supply fuel to the priming system 62. In one embodiment, the controller 18 may generate a command signal to open the shutoff valve 58 based on the startup signal, and open the auxiliary fuel valve 66 based the command signal used to open the shutoff valve 58. It is understood, however, that the auxiliary fuel valve 66 may be initially opened based on different and/or additional inputs, if desired. For example, the controller 18 may open the auxiliary fuel valve 66 when the engine speed $N_E$ increases to a non-zero or other threshold speed, or when the differential pressure $\Delta_P$ increases to a non-zero or other threshold amount.

When the auxiliary fuel valve 66 is open, a portion of fuel from the source 54 may be allowed to circumvent the fuel metering valve 60, the compressor 20, the aftercooler 30, and the throttle valve 32, thereby reducing the distance between the fuel source 54 and the cylinders 40 and reducing the time taken for the portion fuel to reach the cylinders 40 as compared to fuel directed to the inlet 22 of the compressor 20. In this way, diverting a portion of fuel through the auxiliary fuel line 64 and the auxiliary fuel valve 66 may allow the engine 16 to be started more quickly. Fuel may flow through the auxiliary fuel line 64 and the auxiliary fuel valve 66 while fuel is allowed to flow through the fuel metering valve 60, the compressor 20, the aftercooler 30, and the throttle valve 32.

After receiving the startup signal, the controller 18 may also track a time elapsed since a beginning of a cranking state of the engine 16 (Step 306). For example, the controller 18 may activate the timer 70 once the startup signal is received and/or the engine 16 reaches a minimum speed. The timer 70 may generate a signal indicative of the elapsed time and communicate the signal to the controller 18. In other embodiments, the controller 18 may alternatively activate an internal timer or timer function (i.e., the timer 70 may be embedded within the controller 18) after receiving the startup signal. The controller 18 may utilize the timer signal or store an indication of the elapsed time in its memory for further processing.

After receiving the startup signal, controller 18 may also determine and monitor the engine speed $N_E$, the pressure differential $\Delta_P$ between the inlet 36 and the outlet 38 of the throttle valve 32, and the elapsed time (Step 308). It should be noted that the steps 304-308 may be performed in the order shown, concurrently, or in any other order, if desired. The engine speed $N_E$ may be determined, for example, from the signal generated by the sensor 53. The pressure differential $\Delta_P$ may be determined, for example, from the signal generated by the sensor 41. Alternatively, the controller 18 may be configured to determine $\Delta_P$ based on an absolute or gauge pressure sensor or other operating parameters, such as engine speed $N_E$, that are correlated in a lookup table or map stored in its memory.

As fuel flows through the auxiliary fuel valve 66, the controller 18 may monitor the engine speed $N_E$, the pressure differential $\Delta_P$, and the elapsed time, and determine whether the engine speed $N_E$ is greater than or equal to the threshold engine speed $N_{ET}$, whether the pressure differential $\Delta_P$ is greater than or equal to the threshold $\Delta_{PT}$, or whether the elapsed time tracked by the timer 70 is greater than or equal to the elapsed time limit $T_{LIM}$ (Step 310). For example, the controller 18 may compare the engine speed $N_E$ to the threshold engine speed $N_{ET}$, which may be determined by the controller 18 based on one or more parameters (e.g., ambient temperature, oil temperature, altitude, humidity, etc.) and/or based on a map, model, algorithm, or other mathematical function. The controller 18 may also compare the pressure differential $\Delta_P$ to the threshold $\Delta_{PT}$, which may be stored in its memory as a pressure value in a map or table. The controller 18 may also compare the elapsed time tracked by the timer 70 since receiving the startup signal in the step 302 to the elapsed time limit $T_{LIM}$, which may be stored as a time value within its memory. When the statements in the step 310 are false, the controller 18 may determine that the engine 16 may still require fuel from the auxiliary fuel line 64 via the auxiliary fuel valve 66, and may adjust the position of the auxiliary fuel valve 66 based on current operating parameters (see FIG. 4).

Fuel may continue to be directed downstream of the throttle valve 32 via the auxiliary fuel valve 66 until controller 18 determines that at least one of the statements at the step 310 is true or otherwise generates a signal to close the shutoff valve 58 or the auxiliary fuel valve 66. When the controller 18 determines that at least one of the statements at the step 310 is true, the controller 18 may determine that the engine 16 no longer requires fuel from the auxiliary fuel line 64 and may close the auxiliary fuel valve 66 (Step 312). In this way, the controller 18 may reduce the overall startup time and improve the efficiency of the engine 16.

The controller 18 may also close the auxiliary fuel valve 66 when a command signal is generated to close the shutoff valve 58. That is, whenever the controller 18 generates a signal to close the shutoff valve 58, the controller 18 may send the same or a different signal to the auxiliary fuel valve 66 to ensure the auxiliary fuel valve 66 is closed when the shutoff valve 58 is closed. When in the closed position, the shutoff valve 58 may prevent fuel from passing though the fuel system 28 as well as the priming system 62, and may be an indication that the engine 16 is stopping or has stopped. The controller 18 may ensure the auxiliary fuel valve 66 is closed when the shutoff valve 58 is in the closed position. When the controller 18 closes the auxiliary fuel valve 66, the priming process 300 may then be ended (Step 314).

FIG. 4 shows and exemplary valve adjustment process 400 that may be used to adjust the auxiliary fuel valve 66. The controller 18 may begin the valve adjustment process 400 by determining the fuel pressure $P_F$ in the auxiliary fuel line 64 (Step 402). For example, the controller 18 may receive a signal from the sensor 68 indicative of the pressure in the auxiliary fuel line 64 at a location between the fuel source 54 and the auxiliary fuel valve 66. Because the auxiliary fuel line 64 allows the fuel from the source 54 to avoid the fuel metering valve 60 and the compressor 20, the fuel pressure $P_F$ in the auxiliary fuel line 64 may be about equal to the pressure of fuel leaving the shutoff valve 58. Accordingly, changes in fuel pressure leaving the shutoff valve 58 may affect the fuel pressure $P_F$ in the auxiliary fuel line 64, and may affect the amount of fuel that can pass through the auxiliary fuel line 64 for a given position of the auxiliary fuel valve 66.

The controller 18 may also determine the speed $N_E$ of the engine 16 (Step 404). For example, the controller 18 may receive a signal from the sensor 53 indicative of the engine speed $N_E$. The engine speed $N_E$ may be indicative of an amount of air being drawn into the intake manifold 34 that can react with the fuel from the auxiliary fuel line 64 via the auxiliary fuel valve 66. In one embodiment, the controller 18 may reference a table or map stored in its memory that correlates engine speed $N_E$ with mass airflow. In other embodiments, the engine 16 may include a mass airflow sensor, an oxygen sensor (e.g., a lambda sensor), or other type of sensor for determining the amount of air being drawn into the intake manifold 34. It should be noted that the step 404 may be performed after, before, or during the step 402, if desired.

Based on the fuel pressure $P_F$ and the engine speed $N_E$, the controller 18 may determine a desired position command $\theta_1$ of the auxiliary fuel valve 66 (Step 406) that corresponds to achieving a desired air/fuel ratio during the startup of the engine 16. For example, the controller 18 may store in its memory a table or map that correlates the fuel pressure $P_F$, the engine speed $N_E$, and air/fuel ratio with the desired position command $\theta_1$ for achieving certain air/fuel ratios. In one embodiment, the maps and/or tables stored within the controller 18 may be configured to achieve a stoichiometric air/fuel ratio during startup of the engine 16. In other embodiments, the maps and/or tables may be configured to achieve a non-stoichiometric air/fuel ratio (e.g., a rich or lean air/fuel ratio) in order to achieve particular exhaust emissions or improve the startup time of the engine 16. It is understood that the controller 18 may include algorithms, models, and/or other computational elements as alternatives or in addition to the maps and/or tables for determining the desired position command $\theta_1$ for adjusting the auxiliary fuel valve 66.

The controller 18 may also determine the previous position command $\theta_0$ of the auxiliary fuel valve 66 (Step 408). For example, the controller 18 may store in its memory the last position command that was generated and refer to it in the step 408. The controller 18 may determine the previous position command $\theta_0$ after, before, or during any of the steps 402-406, if desired.

The controller 18 may then compare the desired position command $\theta_1$ of the auxiliary fuel valve 66 to the previous position command $\theta_0$ that was used to adjust the position of the auxiliary fuel valve 66 (Step 410). When the desired position command $\theta_1$ of the auxiliary fuel valve 66 is greater than the previous position command $\theta_0$ (Step 410: YES), the controller 18 may generate a signal to adjust the auxiliary fuel valve 66 based on the desired position command $\theta_1$ (Step 412). That is, when the desired position command $\theta_1$ will cause the auxiliary fuel valve 66 to be adjusted to a more open position than the previous position command $\theta_0$, the controller 18 may adjust the auxiliary fuel valve 66 based the desired position command $\theta_1$. Conversely, when the desired position command $\theta_1$ will not cause the auxiliary fuel valve 66 to be adjusted to a more open than the previous position command $\theta_0$, the controller 18 may not adjust the auxiliary fuel valve 66 based on the desired position command $\theta_1$ and may return to the step 402 without adjusting the auxiliary fuel valve 66 (Step 410: NO). In this way, the controller 18 may only allow the auxiliary fuel valve 66 to be opened further (i.e., to a more open position) or remain in its previous position during the startup of the engine 16.

Said another way, the controller 18 may adjust the auxiliary fuel valve 66 based on the desired position command $\theta_1$ only when the desired position command $\theta_1$ is greater than the previous position command $\theta_0$. For example, the controller 18 may be configured to adjust the auxiliary fuel valve 66 to be more open as the pressure $P_F$ in the auxiliary fuel line 64 decreases in order to ensure a sufficient amount of fuel reaches the cylinders 40. The controller 18 may also be configured to adjust the auxiliary fuel valve 66 to be more open as the engine speed $N_E$ increases to ensure that the air/fuel mixture being sent to the intake manifold 34 does not become too lean. However, the controller 18 may not adjust the auxiliary fuel valve 66 to a more closed position until the differential pressure $\Delta_P$ exceeds the differential pressure threshold $\Delta_{PT}$, the timer 70 exceeds the elapsed time limit $T_{LIM}$, or the shutoff valve 58 is in the closed position $\Sigma_C$.

The priming system 62 as illustrated and described herein provides flexibility in implementing the priming system 62 to control the "hand off" of fuel supply between the priming system 62 and the fuel metering valve 60 once the air/fuel mixture is supplied through the throttle valve 32 to the intake manifold 34. In some situations, if too much overlap occurs, the primed cylinders 40 may flood and the engine 16 can stall. In some implementations, a more robust hand off between the priming system 62 and the fuel metering valve 60 with less risk of flooding may be achieved by priming fewer than all of the cylinders 40 of the engine 16 with auxiliary fuel. One-half, one-third, one-quarter or other appropriate portion of the cylinders 40 as necessary in a particular implementation may be primed to reduce or eliminate the risk of stalling the engine 16. The engine 16 starts and increases speed using the combustion in the primed cylinders 40, and the non-primed cylinders 40 can begin combustion when the air/fuel mixture arrives without the risk of being supplied simultaneously with the air/fuel mixture and the auxiliary fuel. Even if some flooding occurs in the primed cylinders 40, the engine 16 will continue to run off the fuel from the fuel metering valve 60 in the non-primed cylinders 40 as the primed cylinders 40 have the auxiliary fuel cut off and the excess fuel dissipated as the crankshaft 44 cranks the corresponding pistons 42.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A priming system for an engine system having a throttle valve configured to regulate a flow of air and fuel into an intake manifold of an engine having a plurality of cylinders, the priming system comprising:
    a first sensor configured to generate a first sensor signal indicative of a value of an engine parameter;
    an auxiliary fuel line configured to direct fuel from a fuel source to a primed cylinder subset of the plurality of cylinders, wherein the auxiliary fuel line is not fluidly connected to a non-primed cylinder subset that comprises the plurality of cylinders that are not in the primed cylinder subset;
    an auxiliary fuel valve disposed in the auxiliary fuel line; and
    a controller in communication with the first sensor and the auxiliary fuel valve, wherein the controller is configured to determine the value of the engine parameter based on the first sensor signal, and to close the auxiliary fuel valve and cease directing fuel through the auxiliary fuel valve to the primed cylinder subset when the value of the engine parameter is greater than or equal to a threshold engine parameter value.

2. The priming system of claim 1, wherein the engine parameter is one of an engine speed and a pressure differential.

3. The priming system of claim 1, wherein the controller is further configured to:
    track a time elapsed since a beginning of a cranking state of the engine; and
    close the auxiliary fuel valve when the time elapsed exceeds an elapsed time limit.

4. The priming system of claim 1, wherein the primed cylinder subset comprises one-half of the plurality of cylinders.

5. The priming system of claim 1, wherein the primed cylinder subset comprises one-third of the plurality of cylinders.

6. The priming system of claim 1, wherein the primed cylinder subset comprises one-fourth of the plurality of cylinders.

7. The priming system of claim 1, wherein combustion in the plurality of cylinders occurs according to a cylinder firing order, and wherein the primed cylinder subset comprises every other one of the plurality of cylinders according to the cylinder firing order.

8. The priming system of claim 1, wherein combustion in the plurality of cylinders occurs according to a cylinder firing order, and wherein the primed cylinder subset comprises every third one of the plurality of cylinders according to the cylinder firing order.

9. The priming system of claim 1, wherein combustion in the plurality of cylinders occurs according to a cylinder firing order, and wherein the primed cylinder subset comprises every fourth one of the plurality of cylinders according to the cylinder firing order.

10. The priming system of claim 1, wherein the intake manifold of the engine comprises:
    a first intake manifold portion fluidly connected to the throttle valve and to the non-primed cylinder subset of the plurality of cylinders, wherein the auxiliary fuel line is not fluidly connected to the first intake manifold portion; and
    a second intake manifold portion fluidly connected to the throttle valve, to the auxiliary fuel line and to the primed cylinder subset of the plurality of cylinders.

11. The priming system of claim 1, wherein each of the plurality of cylinders in the primed cylinder subset is fluidly connected to the auxiliary fuel line by a corresponding runner.

12. A method of priming a fuel system for an engine system having a throttle valve configured to regulate a flow of air and fuel into an intake manifold of an engine having a plurality of cylinders, the method comprising:
supplying air and fuel to an inlet of the throttle valve;
directing fuel from a fuel source through an auxiliary fuel line to a primed cylinder subset of the plurality of cylinders, wherein the auxiliary fuel line is not fluidly connected to a non-primed cylinder subset that comprises the plurality of cylinders that are not in the primed cylinder subset;
determining a value of an engine parameter, and
closing an auxiliary fuel valve disposed in the auxiliary fuel line and ceasing directing fuel through the auxiliary fuel valve to the primed cylinder subset when the value of the engine parameter is greater than or equal to a threshold engine parameter value.

13. The method of priming of claim 12, wherein the primed cylinder subset comprises one-half of the plurality of cylinders.

14. The method of priming of claim 12, wherein the primed cylinder subset comprises one-third of the plurality of cylinders.

15. The method of priming of claim 12, wherein the primed cylinder subset comprises one-fourth of the plurality of cylinders.

16. The method of priming of claim 12, wherein combustion in the plurality of cylinders occurs according to a cylinder firing order, and wherein the primed cylinder subset comprises every other one of the plurality of cylinders according to the cylinder firing order.

17. The method of priming of claim 12, wherein combustion in the plurality of cylinders occurs according to a cylinder firing order, and wherein the primed cylinder subset comprises every third one of the plurality of cylinders according to the cylinder firing order.

18. The method of priming of claim 12, wherein combustion in the plurality of cylinders occurs according to a cylinder firing order, and wherein the primed cylinder subset comprises every fourth one of the plurality of cylinders according to the cylinder firing order.

19. The priming system of claim 12, wherein the intake manifold of the engine includes a first intake manifold portion fluidly connected to the throttle valve and to the non-primed cylinder subset of the plurality of cylinders, and a second intake manifold portion fluidly connected to the throttle valve, to the auxiliary fuel line and to the primed cylinder subset of the plurality of cylinders, wherein the auxiliary fuel line is not fluidly connected to the first intake manifold portion, and wherein directing fluid from the fuel source to the primed cylinder subset comprised directing fluid from the fuel source to the second intake manifold portion.

20. A genset comprising:
an electric generator;
an engine system configured to drive the generator and including:
an engine mechanically coupled to the generator and configured to combust a fuel from a fuel source to rotate the generator,
a throttle valve having an inlet and an outlet and configured to regulate a flow of air and fuel to an intake manifold of the engine,
a first sensor configured to generate a first sensor signal indicative of a value of an engine parameter,
an auxiliary fuel line configured to direct fuel from the fuel source to a primed cylinder subset of a plurality of cylinders of the engine, wherein the auxiliary fuel line is not fluidly connected to a non-primed cylinder subset that comprises the plurality of cylinders that are not in the primed cylinder subset, and
an auxiliary fuel valve disposed in the auxiliary fuel line; and
a controller in communication with the first sensor and the auxiliary fuel valve, wherein the controller is configured to close the auxiliary fuel valve and cease directing fuel from the auxiliary fuel line to the primed cylinder subset when the value of the engine parameter is greater than or equal to a threshold engine parameter value.

* * * * *